United States Patent
Burdon

(10) Patent No.: US 6,614,425 B1
(45) Date of Patent: Sep. 2, 2003

(54) SYSTEM AND METHOD FOR THE ADAPTIVE MAPPING OF MATRIX DATA TO SETS OF POLYGONS

(75) Inventor: David Burdon, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/575,435

(22) Filed: May 22, 2000

(51) Int. Cl.[7] .............................. G06T 1/00; G06K 9/36
(52) U.S. Cl. ..................... 345/418; 345/420; 345/421; 345/530; 345/643; 345/644; 345/422; 382/276; 382/282; 382/293
(58) Field of Search ................................ 345/418–421, 345/424–428, 581–600, 605–606, 619–626, 644, 24, 643, 441–443, 467–470, 530–531, 546–549, 551–556, 55, 59; 382/106–108, 162, 165, 167–173, 304, 276, 277, 282, 285, 293, 295; 707/1, 200, 205, 104

(56) References Cited

U.S. PATENT DOCUMENTS

| 5,363,107 | A |   | 11/1994 | Gertz et al. |           |
|-----------|---|---|---------|--------------|-----------|
| 5,892,517 | A | * | 4/1999  | Rich         | 345/582   |
| 5,943,060 | A | * | 8/1999  | Cosman et al.| 345/583   |
| 5,974,423 | A | * | 10/1999 | Margolin     | 707/104   |
| 6,104,842 | A | * | 8/2000  | Rich         | 382/304   |
| 6,108,460 | A | * | 8/2000  | Rich         | 382/304   |
| 6,130,669 | A | * | 10/2000 | Wittig et al.| 345/419   |
| 6,330,003 | B1| * | 12/2001 | Curtis et al.| 345/648   |

* cited by examiner

Primary Examiner—Matthew C. Bella
Assistant Examiner—Wesner Sajous

(57) ABSTRACT

A system and method for converting bitmapped data, for example, weather data or thermal imaging data, to polygons is disclosed. The conversion of the data into polygons creates smaller data files. The invention is adaptive in that it allows for a variable degree of fidelity of the polygons. Matrix data is obtained. A color value is obtained. The color value is a variable used in the creation of the polygons. A list of cells to check is determined based on the color value. The list of cells to check is examined in order to determine a boundary list. The boundary list is then examined to determine vertices. The determination of the vertices is based on a prescribed maximum distance. When drawn, the ordered list of vertices create polygons which depict the cell data. The data files which include the vertices for the polygons are much smaller than the corresponding cell data files. The fidelity of the polygon representation can be adjusted by repeating the logic with varying fidelity values to achieve a given maximum file size or a maximum number of vertices per polygon.

17 Claims, 17 Drawing Sheets

SYSTEM AND METHOD FOR THE ADAPTIVE MAPPING OF MATRIX DATA TO SETS OF POLYGONS

The invention described herein was made in the performance of work under NASA Contract No. NRA 98-LaRC-2 and is subject to the provisions of Section 305 of the Nautical Aeronautics and Space Act of 1958 (42 U.S.C. 2457).

FIELD OF THE INVENTION

This invention relates generally to data conversion and, more particularly, to a method for the adaptive mapping of matrix data to sets of polygons.

BACKGROUND OF THE INVENTION

Data can be disseminated in a variety of formats. Some data is ideally suited to be disseminated in a matrix, e.g., bitmap format. For example, weather data and thermal imaging data are typically disseminated as bitmaps coded into electronic binary files. This format enables easy processing to display on computer monitors. However, there are some problems with this format. Since large files are not uncommon (e.g., 40 megabytes), great demands are placed on data link facilities and processing platforms.

Prior art systems have attempted to solve the problems associated with matrix data by creating polygons in order to decrease the file sizes. These prior art systems create polygons from matrix data by limiting the process to convex sets of data by finding the centroid and selecting vertices at the intersection of the boundary and rays drawn from the center which are spaced by a specified number of degrees. Manual intervention may be used to complete the mapping. This process has a couple of problems. First, there is an assumption that the polygons are convex in shape. To overcome this assumption which is often incorrect, a manual method may be used.

Manual methods use a drawing device, such as a mouse, to draw polygons. Manual methods have several drawbacks. Manual methods are slow and cannot keep up with the currently available data. For example, weather data is updated at fairly frequent intervals, such as, every five minutes. Manual methods are low fidelity. That is, they are not very accurate. Manual methods also produce inconsistent results. That is, the fidelity of the polygons varies with different individuals and with a single individual over time, as he or she becomes tired or bored. Thus, a need exists for a method for disseminating matrix data in a format which will ease the burden placed on data link facilities and processing platforms. The method should accommodate non-convex (e.g., concave) polygons without requiring manual intervention.

SUMMARY OF THE INVENTION

In accordance with the present invention, a system and method transform matrix data into smaller file sizes by creating polygons for the matrix data by using an adaptive fidelity polygon process.

In accordance with other aspects of the invention, the adaptive fidelity polygon process converts a matrix of data into at least one polygon. The process is accomplished via the following steps: (1) determining the open, semi-cardinal directions for each cell in the matrix; (2) determining blocked cardinal directions for each cell in the matrix; (3) determining a list of cells to check based on a specified color value; (4) determining a list of boundary cells from the list of cells to be checked; and (5) determining a list of vertices from the list of boundary cells. By plotting the vertices in sequential order, one or more polygons which represent the original matrix data can be displayed.

In accordance with other aspects of the invention, the fidelity of the polygon representation can be adjusted automatically to meet other criteria. For example, logic can be performed repeatedly in order to reduce the fidelity until a polygon is completely represented in fewer than a maximum number of vertices or until a whole matrix is represented within a prescribed file size.

BRIEF DESCRIPTION OF THE DRAWINGS

The subject invention will hereinafter be described in conjunction with the appended drawing figures, wherein like numerals denote like elements, and.

DETAILED DESCRIPTION OF A PREFERRED EMBODIMENT

Figure 1:
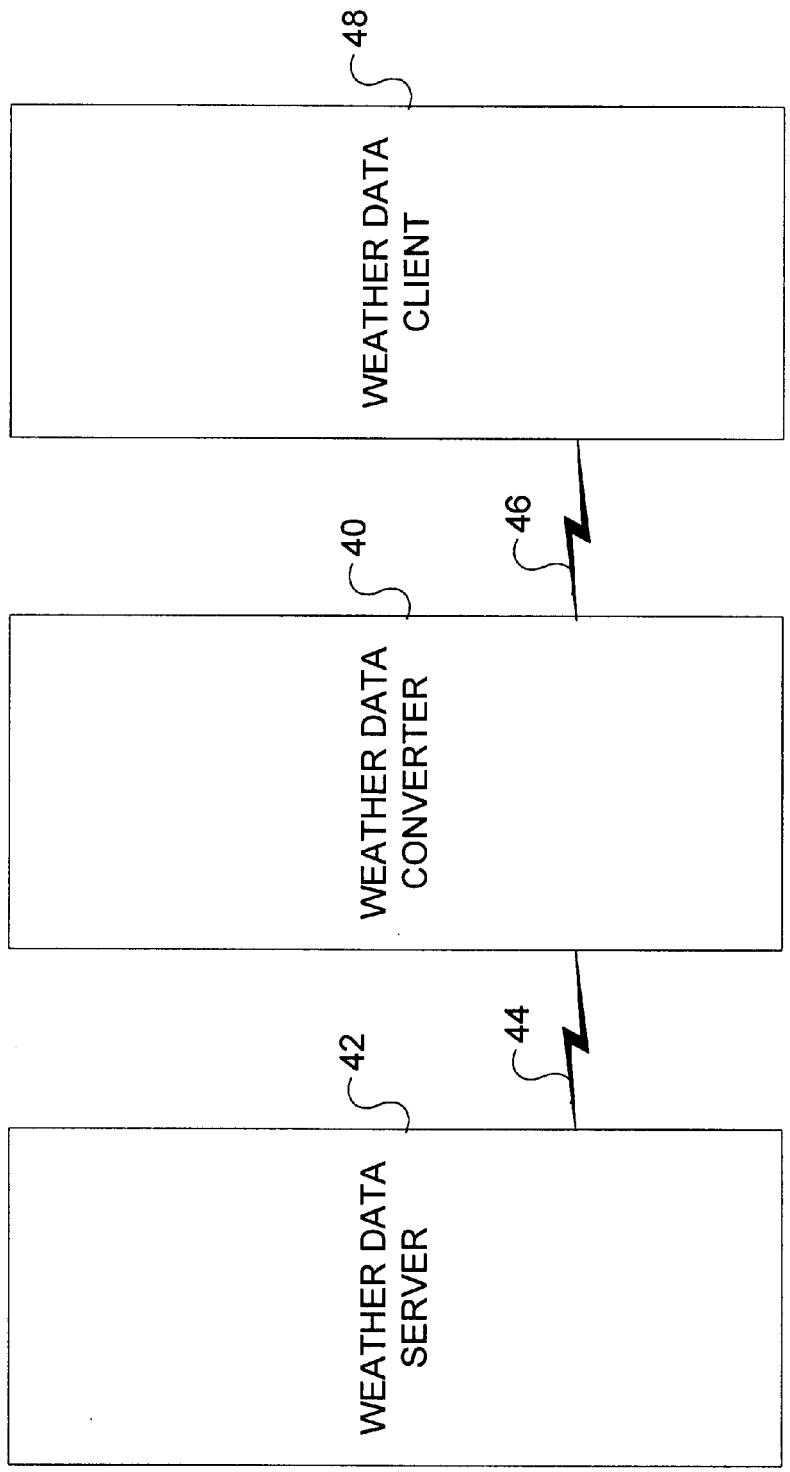
FIG. 1 is a block diagram of a computing environment suitable for implementing the present invention.

The present invention converts matrix data into polygon data. An example of matrix formatted data is weather data. The invention is described herein in context of weather data. However, it will be appreciated that the present invention applies to any data in matrix format, for example, thermal imaging data and the like. FIG. 1 illustrates a computing environment suitable for implementing the present invention. A weather data converter 40 converts weather data that is in a bitmap format into weather data that is described in terms of polygons which is expressed as a series of data points representing vertices of one or more polygons. The weather data converter 40 may receive the bitmap weather data from a weather data server 42 over an interface 44. The weather data converter 40 may display the polygon format weather data and/or it may transmit the polygon format weather data to one or more weather data clients 48 over an interface 46. The weather data client 48 may display the polygon weather data and/or it may transmit the polygon weather data to another weather data client.

Figure 2:
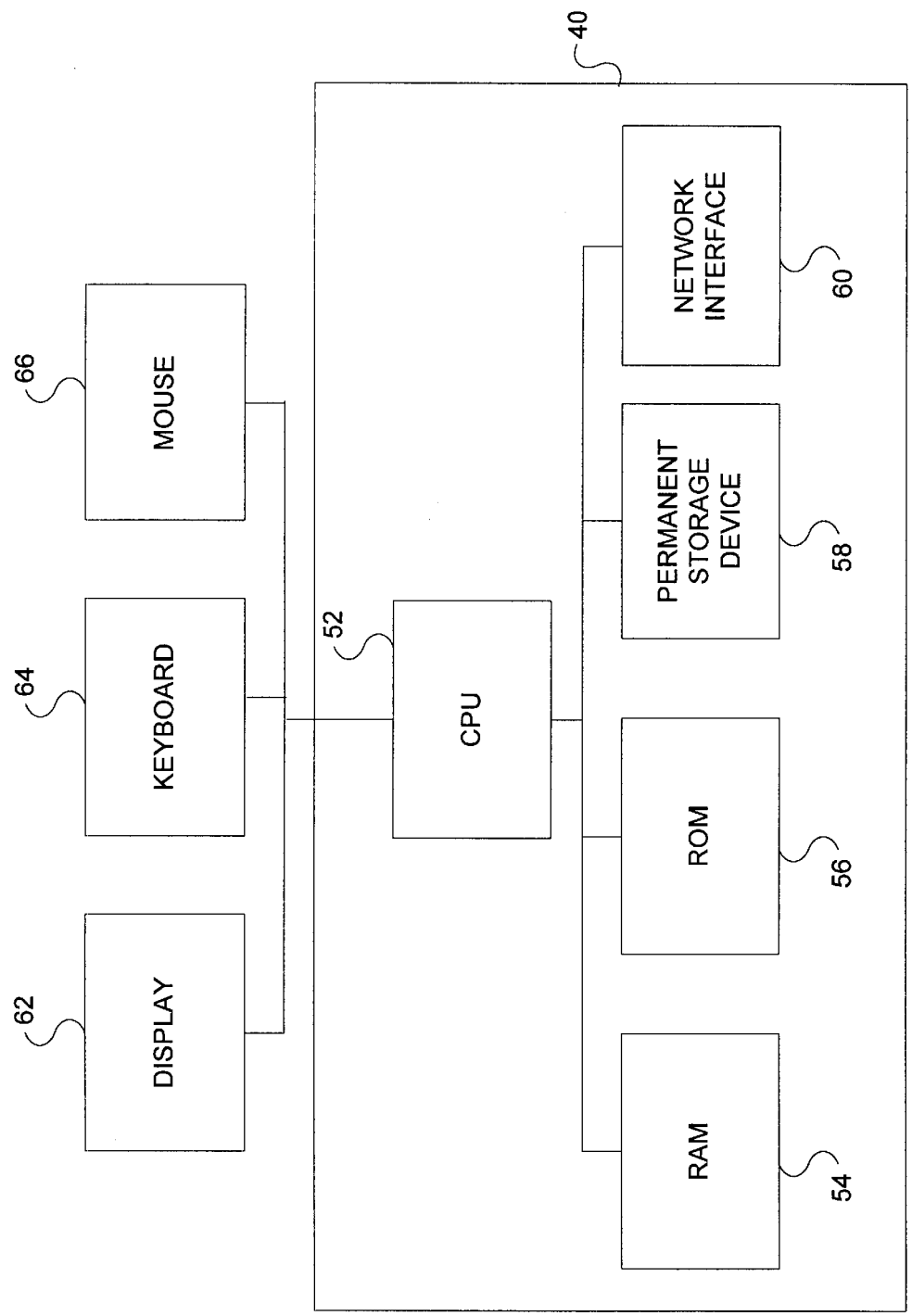
FIG. 2 is a block diagram of the weather data converter of FIG. 1.

FIG. 2 illustrates in further detail an exemplary weather data converter 40 suitable for implementing the present invention. Weather data converter 40 includes a central processing unit (CPU) 52. Weather data converter 40 also includes memory in the form of random access memory (RAM) 54 and read-only memory (ROM) 56. Weather data converter 40 also includes a permanent storage device 58, such as a hard disk drive.

Weather data converter 40 also includes a network interface 60 which includes the necessary circuitry for remote communications. For example, weather data converter 40 may receive bitmap format weather data from weather data server 42 and/or it may transmit polygon format weather data to weather data client 48. These communications may occur, for example, over a local area network (LAN), a wide area network (WAN) or the Internet.

Weather data converter 40 includes a display device 62, a keyboard 64, and a pointing device, such as a mouse 66.

It will be appreciated that many computing environments are suitable for implementing the present invention. For example, weather data converter 40 may be a mainframe computer or a Personal Computer (PC). It will also be appreciated that weather data converter 40 contains many more components than those illustrated in FIG. 2, however it is not necessary to show all of theses components in order to disclose an illustrative computing environment suitable for implementing the present invention. It will also be appreciated that weather data server 42 and the weather data client 48 contain similar components to the exemplary weather data converter 40 shown in FIG. 2 and are not described in further detail herein.

Figure 3:
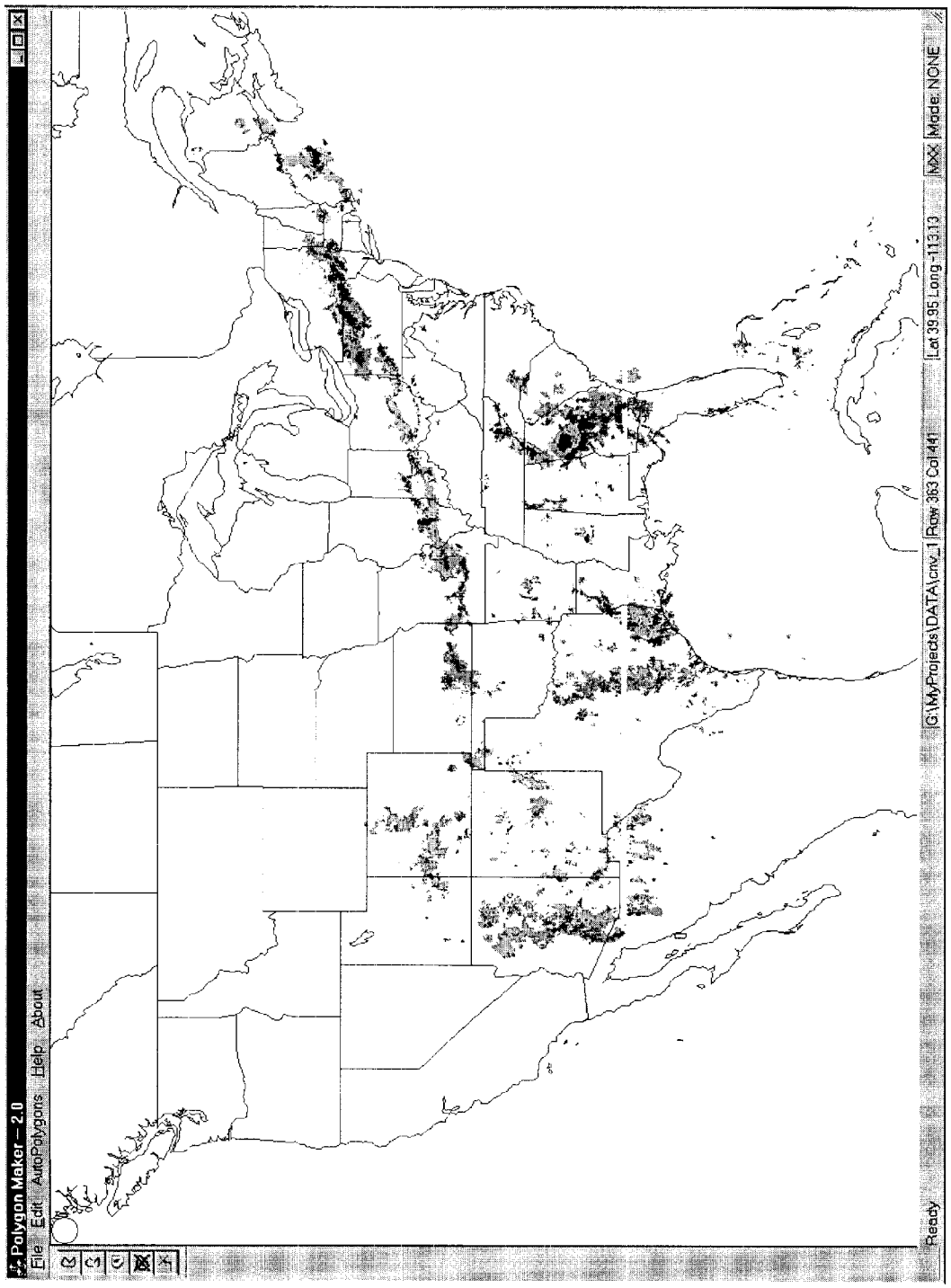
FIG. 3 is an example of a typical radar weather map.

FIG. 3 illustrates a typical radar weather map. Weather data is disseminated as bitmaps coded into electronic binary files. Large weather data files are not uncommon (e.g., 40 megabytes). The present invention converts traditional weather data from its bitmap format to polygon data. Each polygon is defined as a set of sequential data points (i.e., vertices) which can be in an x/y format or in a latitude/longitude format. Sequentially connecting the data points forms one or more closed polygons which correspond to the original bitmap depiction. Thus, when the polygons created using the present invention are drawn they look the same as the bitmap data from which they were generated. The present invention is adaptive in that the fidelity can be altered. That is, the invention can produce polygons which vary in coarseness. A coarser value will result in a polygon with less vertices and therefore smaller file sizes. If a higher degree of fidelity is desired, the file size will increase.

Figure 4:
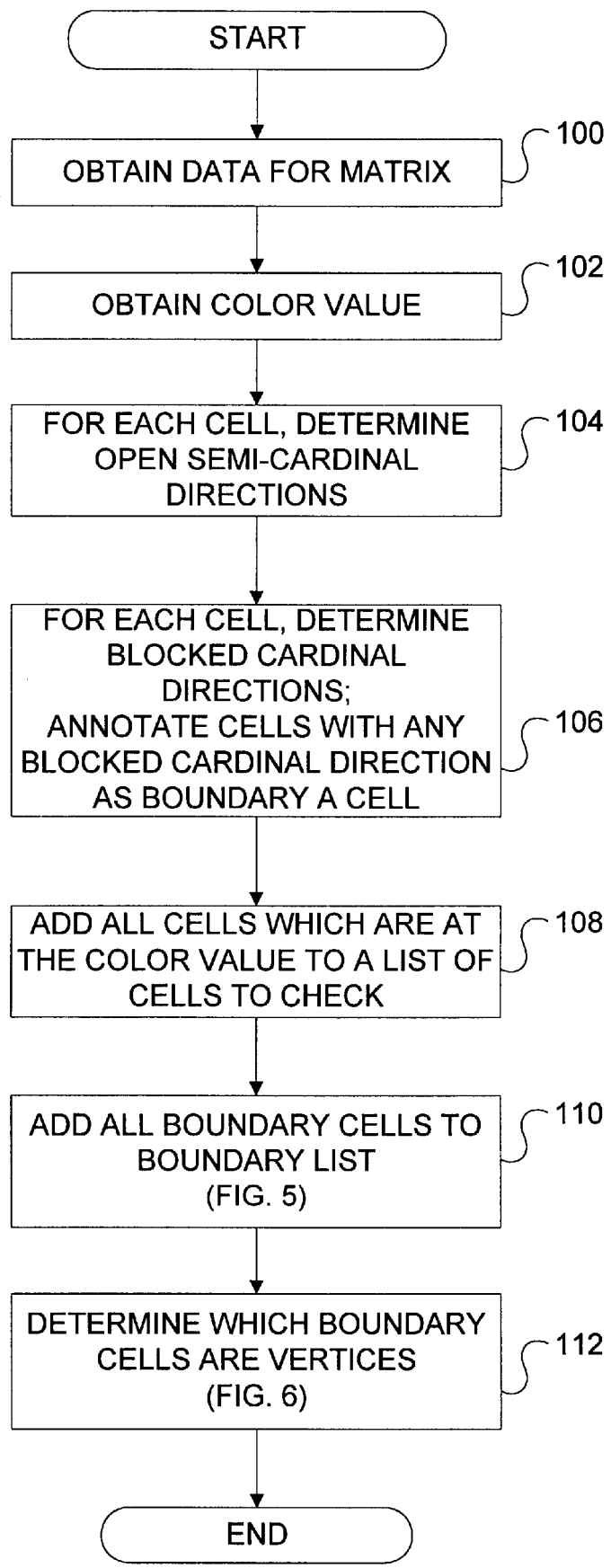
FIG. 4 is a flow diagram illustrating exemplary logic for a method of adaptive mapping of matrix data to sets of polygons in accordance with the present invention.
Figure 7:
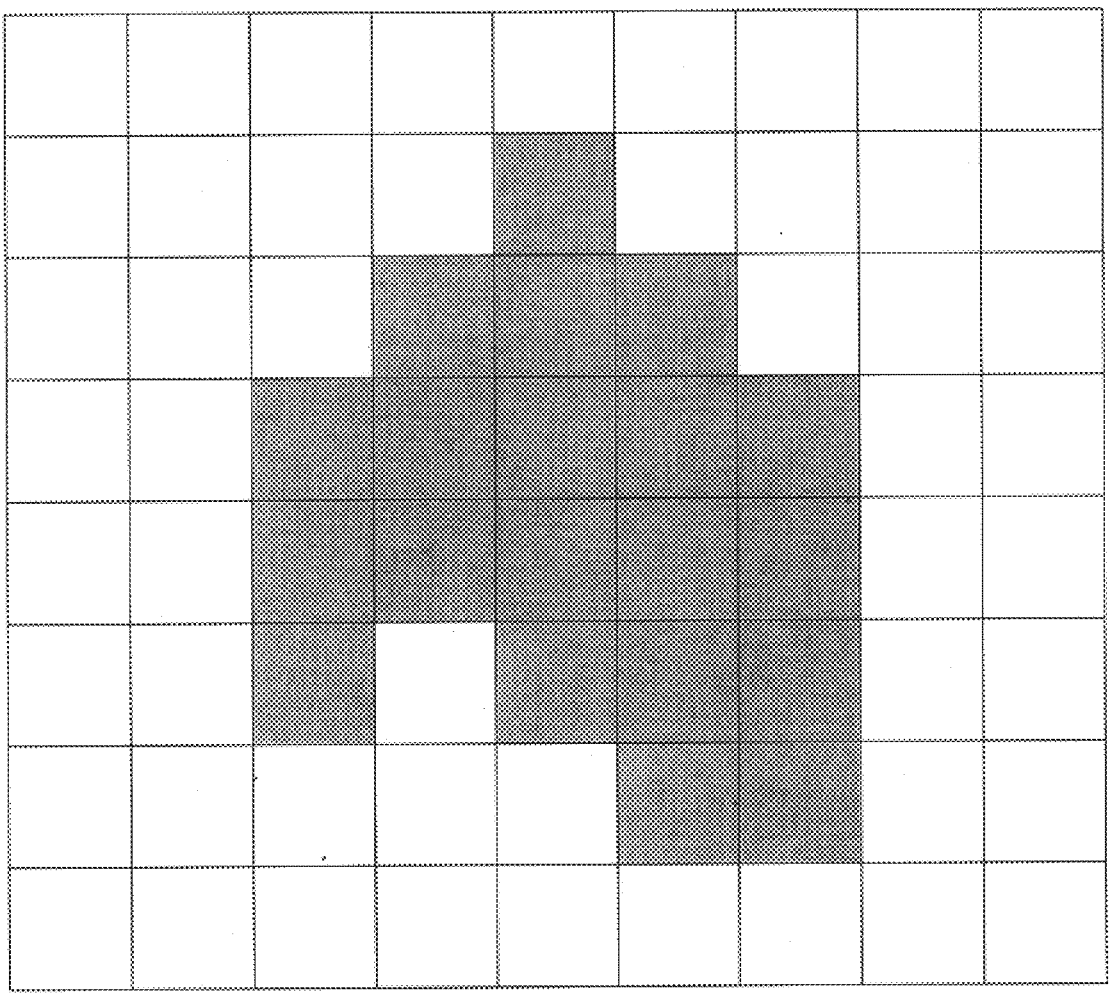
FIG. 7 is an exemplary matrix of data.

FIG. 4 is a flow diagram illustrating.exemplary logic for a method of adaptive mapping of matrix data, for example weather data, to sets of polygons in accordance with the present invention. It will be appreciated that the logic of FIG. 4 is a simplistic example using a single color. Logic for multiple colors and criteria restriction, such as file size or number of vertices are described later. The logic of FIG. 4 moves from a start block to block 100 where data for a matrix is obtained. Disregarding any compression modes, the matrix data can be bitmapped or gridded. Both of these formats are interpreted as two-dimensional arrays of fixed lateral disposition in both x and y directions with each cell in the matrix having a fixed value. The display medium is responsible for translating the data value into a particular color. Both formats of data can be addressed in terms of x and y. Gridded data can also be associated with a latitude and a longitude. FIG. 7 illustrates exemplary matrix data. In the illustrated example, there are only two colors. It will be appreciated that there can be more than two colors as described in detail later.

Figure 8:
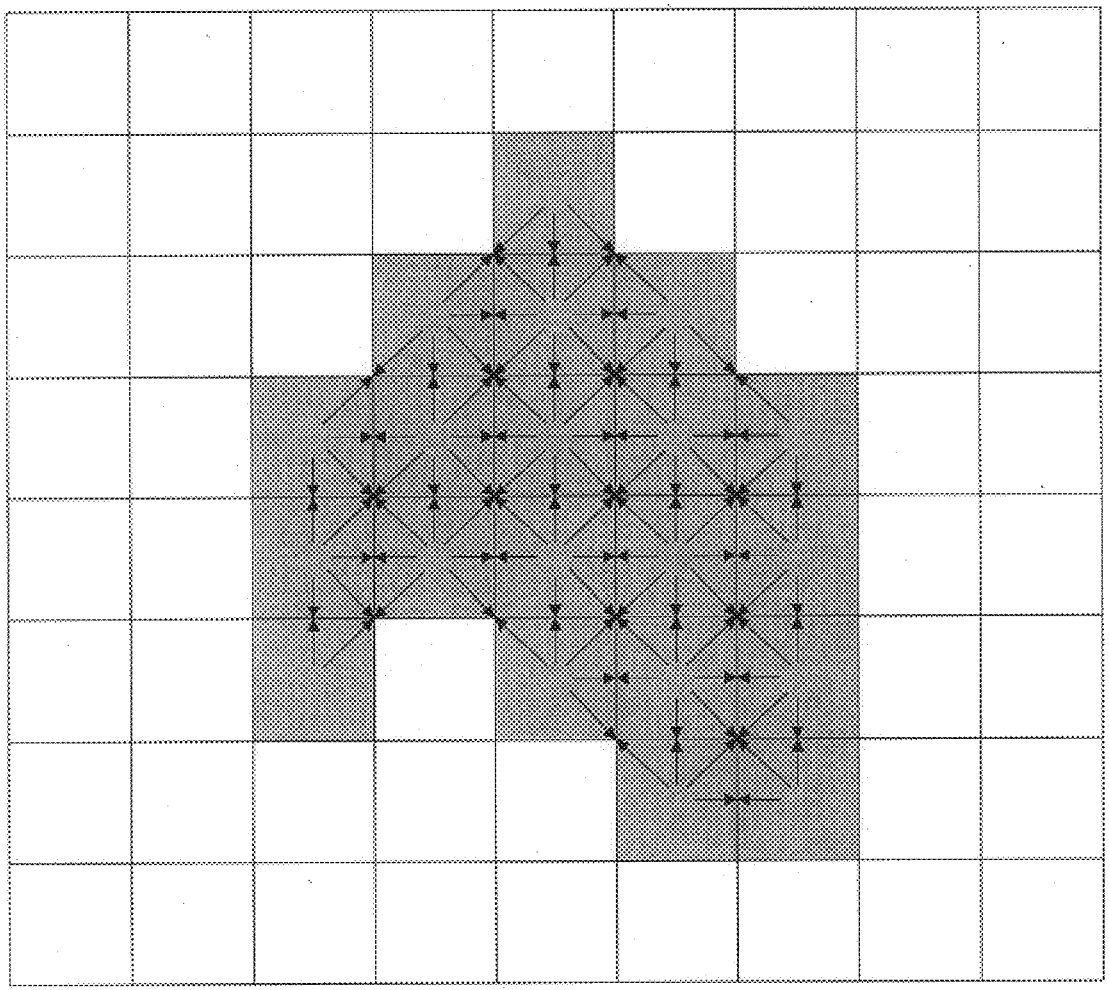
FIG. 8 illustrates the open semi-cardinal directions for the exemplary matrix of data shown in FIG. 7.

After the matrix data is obtained, the logic of FIG. 4 moves to block 102 where a color value is obtained. In a preferred embodiment of the invention, the color is represented by an integer value. The display medium is responsible for translating the color value into a particular color. In a preferred embodiment, higher integer values translate to darker colors and the logic of FIG. 4 is repeated for each color value contained in the matrix data starting with the lowest color value. Next, the logic moves to block 104 where the color values for each cell are examined to determine the open semi-cardinal directions (N, NE, E, SE, S, SW, W, NW) for the cell. If an adjacent cell in one of the semi-cardinal directions has the same color value, this is a possible direction in which the boundary may extend. All such directions are recorded as "open" for the cell being examined. Preferably, any cell which has a value equal to or greater than the specified color value is considered to be equal. Put another way, the selected color value can be a range of color values. FIG. 8 illustrates the "open" directions for the matrix data of FIG. 7. The "open" directions are represented by arrows.

Figure 9:
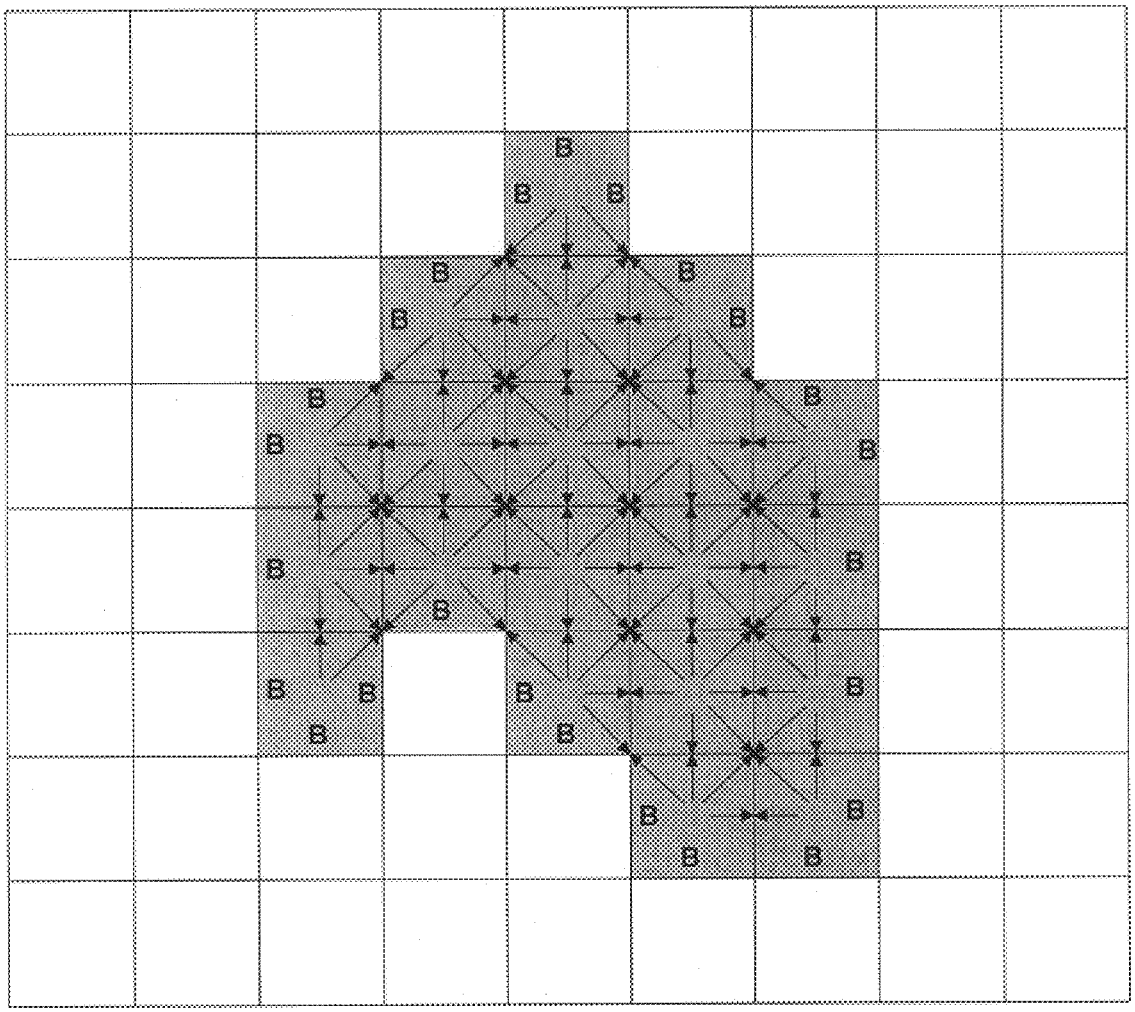
FIG. 9 illustrates the blocked cardinal directions for the exemplary matrix of data shown in FIG. 7.

The logic of FIG. 4 then moves to block 106 where each cell is examined to determine the blocked cardinal directions (NESW). If an adjacent cell in a cardinal direction has a lower color value, it is a blocked direction. All such directions are recorded for the cell being examined. FIG. 9 indicates blocked cardinal directions with a "B" for the cells in the illustrated example of the matrix data shown in FIG. 7. If a cell contains any blocked cardinal directions, then the cell itself must be a boundary cell and is annotated as such.

The logic of FIG. 4 then moves to block 108 where all cells which have the specified color value are added to a list of cells to check. As mentioned above, this may actually be more than one color value. For example, the list may include all color values equal to or greater than a specified value. Next, the logic moves to block 110 where all of the cells in the list of cells to check are examined to determine if they are boundary cells. If a cell is a boundary cell, it is added to a boundary list as shown in detail in FIG. 5 and described next.

Figure 5:
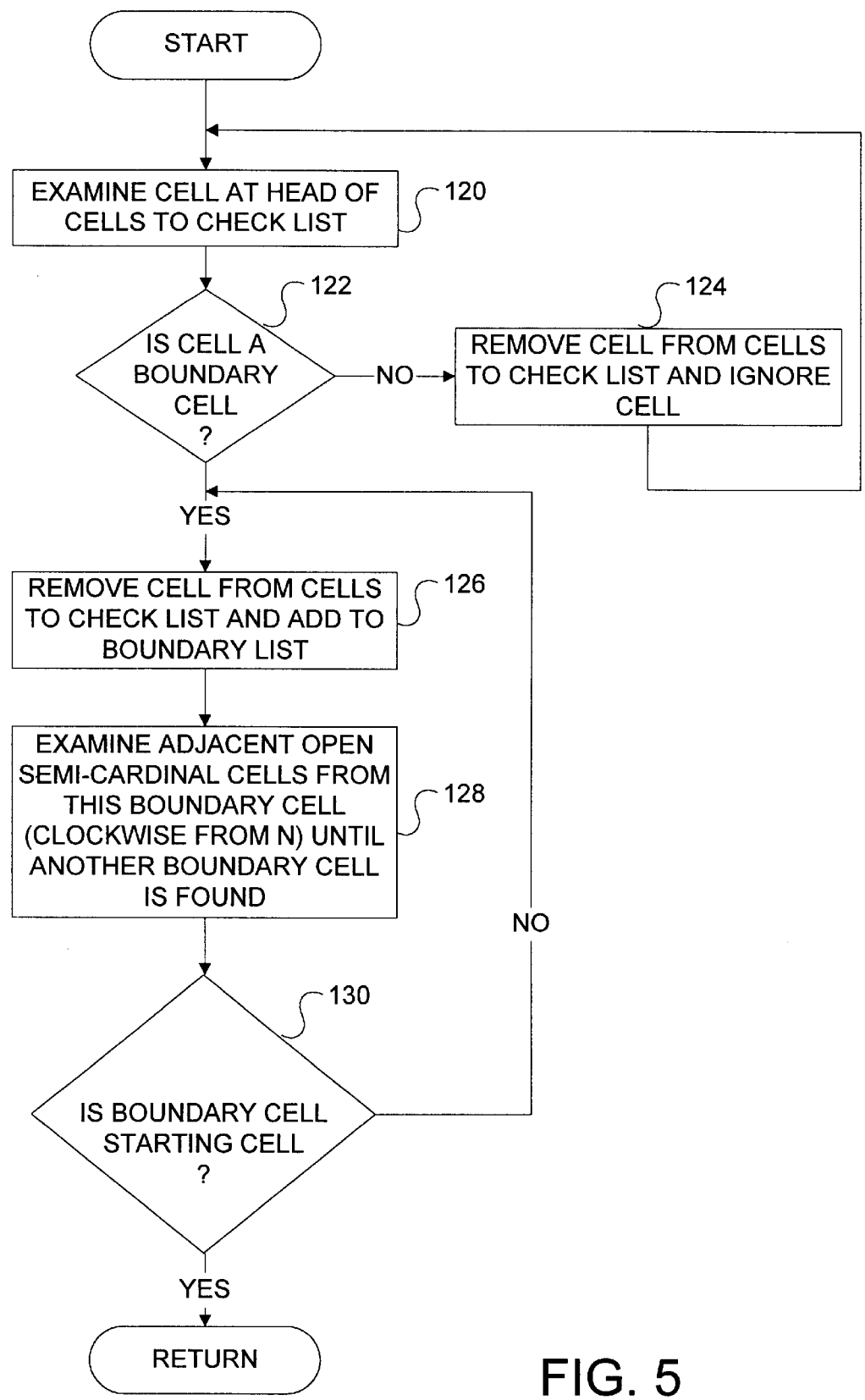
FIG. 5 is a flow diagram illustrating in detail exemplary logic for determining a boundary list for a matrix of data.

FIG. 5 illustrates in detail the logic of determining a boundary list. The logic moves from a start block to block 120 where the cell at the head of the cells to check list is examined. The logic then moves to decision block 122 where a test is made to determine if the cell is a boundary cell. As described above, if any of the cardinal directions are blocked, the cell is a boundary cell and was annotated as such in block 106. If the cell is not a boundary cell, the logic moves to block 124 where the cell is removed from the list of cells to check and is ignored. The logic then returns to block 120 where the new head of the cells to check list is examined.

Figure 10:
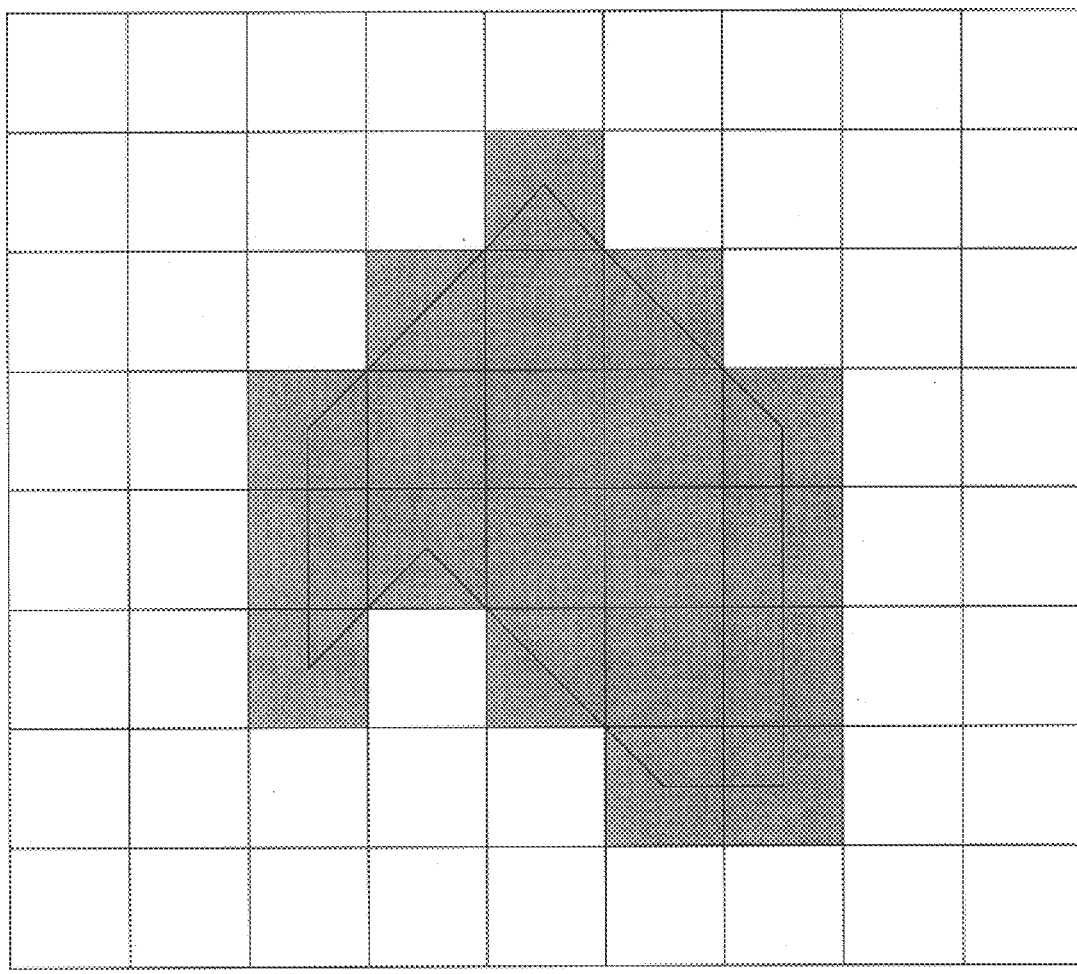
FIG. 10 illustrates the boundary for the polygon of the exemplary matrix of data shown in FIG. 7.

If it is determined in decision block 122 that the cell at the head of the cells to check list is a boundary cell, the logic proceeds to block 126 where the cell is removed from the cells to check list and is added to the boundary list. Next, the logic moves to block 128 where the adjacent, semi-cardinal cells from the boundary cell that was just added to the boundary list are examined (in a clockwise direction starting from N) until another boundary cell in the cells to check list is found. The logic of blocks 126 and 128 is repeated until it is determined in decision block 130 that the starting cell of the boundary list has been encountered. When the starting cell in the boundary list is encountered, the boundary is complete and the logic of FIG. 5 ends and processing returns to FIG. 4. FIG. 10 illustrates the boundary of the polygon generated from the matrix data of FIG. 7.

Figure 6:
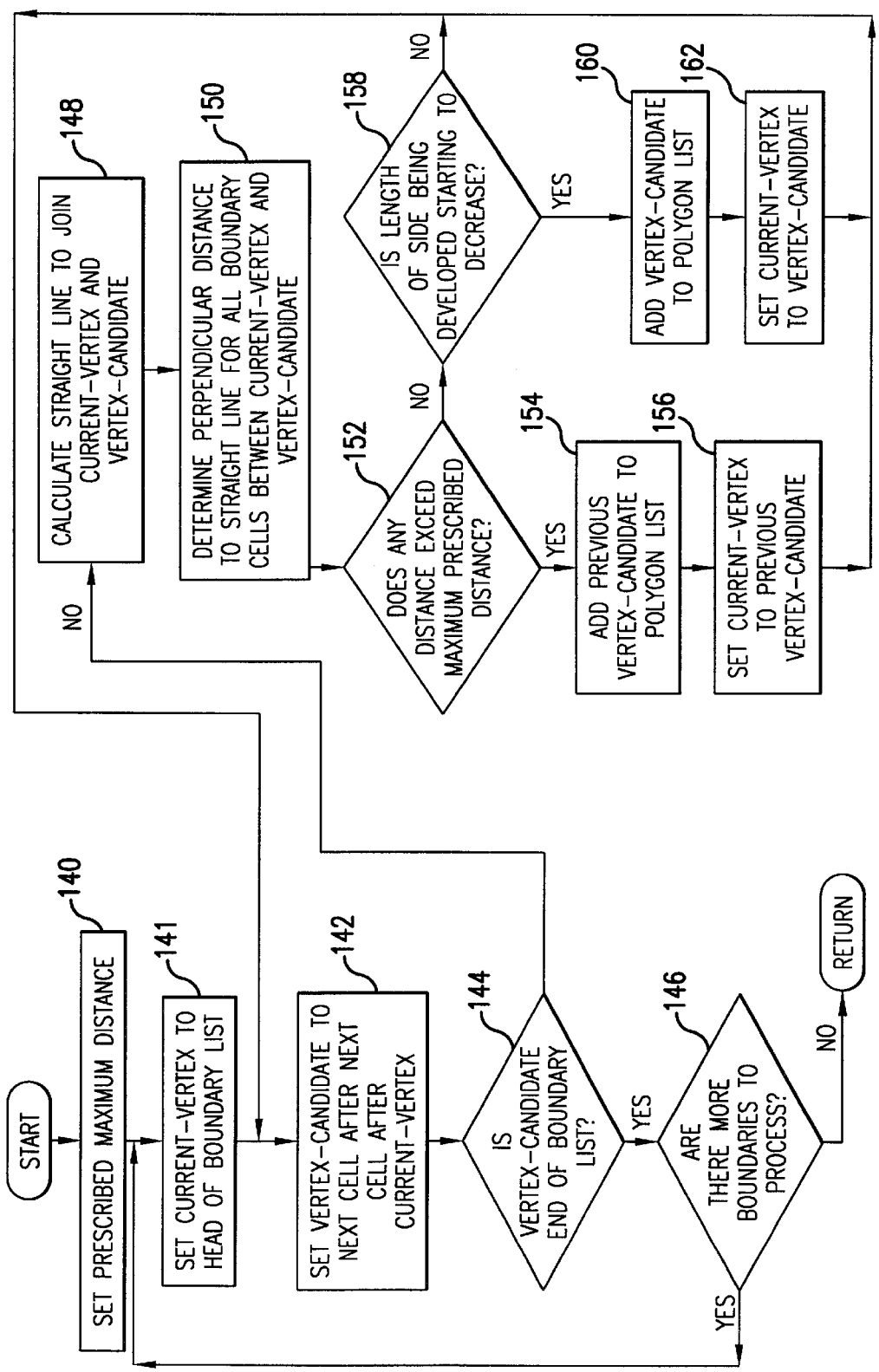
FIG. 6 is a flow diagram illustrating in detail exemplary logic for determining vertices for a polygon using the boundary list produced in FIG. 5.

Next, the logic of FIG. 4 moves to block 112 to determine which boundary cells are vertices as shown in detail in FIG. 6. In a preferred embodiment, for each boundary, the head cell of the boundary list is defined as the head vertex of the polygon list. The logic of FIG. 6 moves from a start block to block 140 where a prescribed maximum distance is set. The prescribed maximum distance is used to determine the vertices as described below. The greater the prescribed maximum distance the lower the fidelity. Next, the logic moves to block 141 where current-vertex is set to the head of the boundary list. Next, in block 142, vertex-candidate is set to the next cell after the next cell of the current-vertex. The logic then moves to decision block 144 where a test is made to determine if vertex-candidate is the end of the boundary list.

Figure 11:
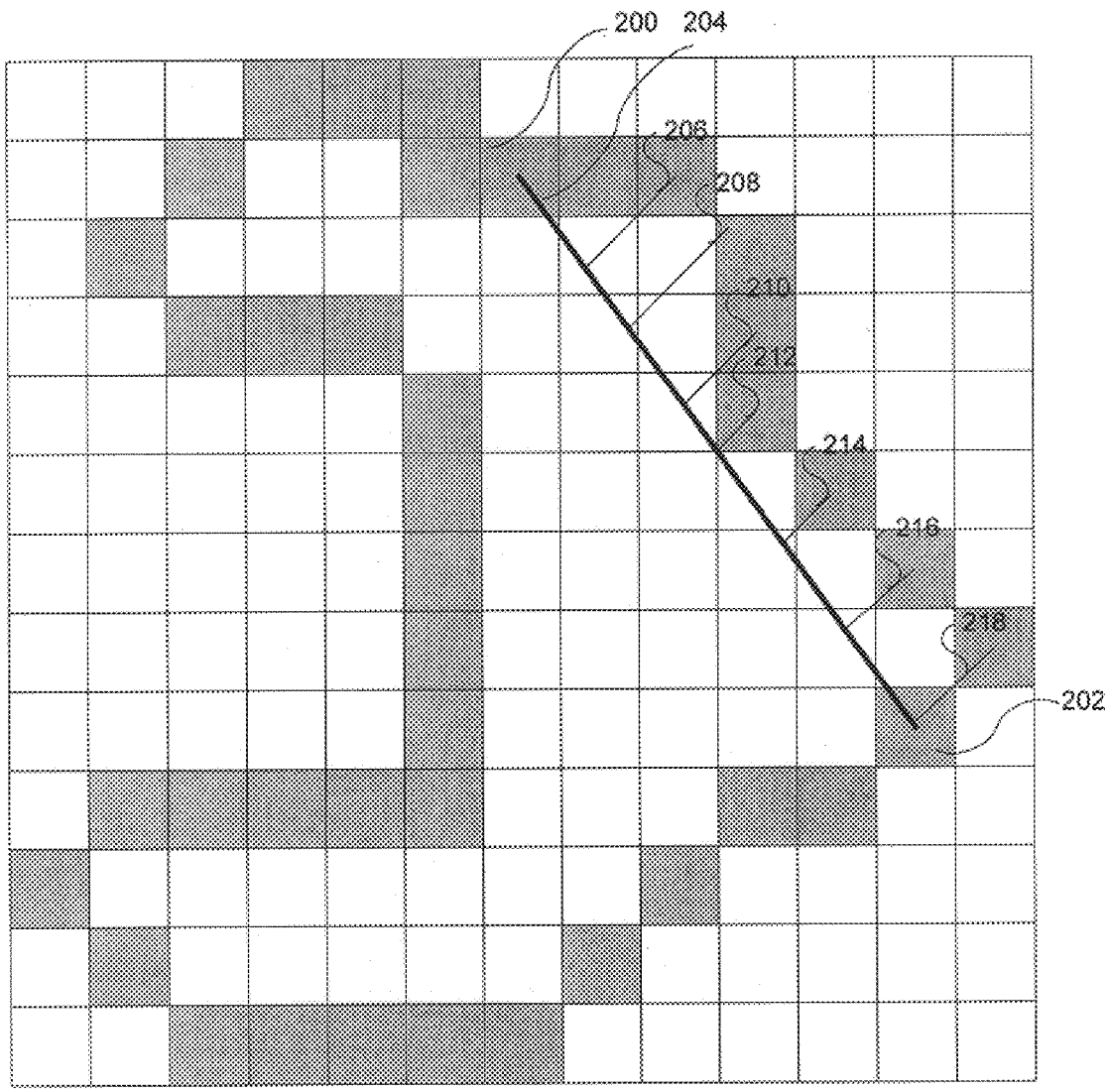
FIG. 11 illustrates a side of a polygon being developed.
Figure 12:
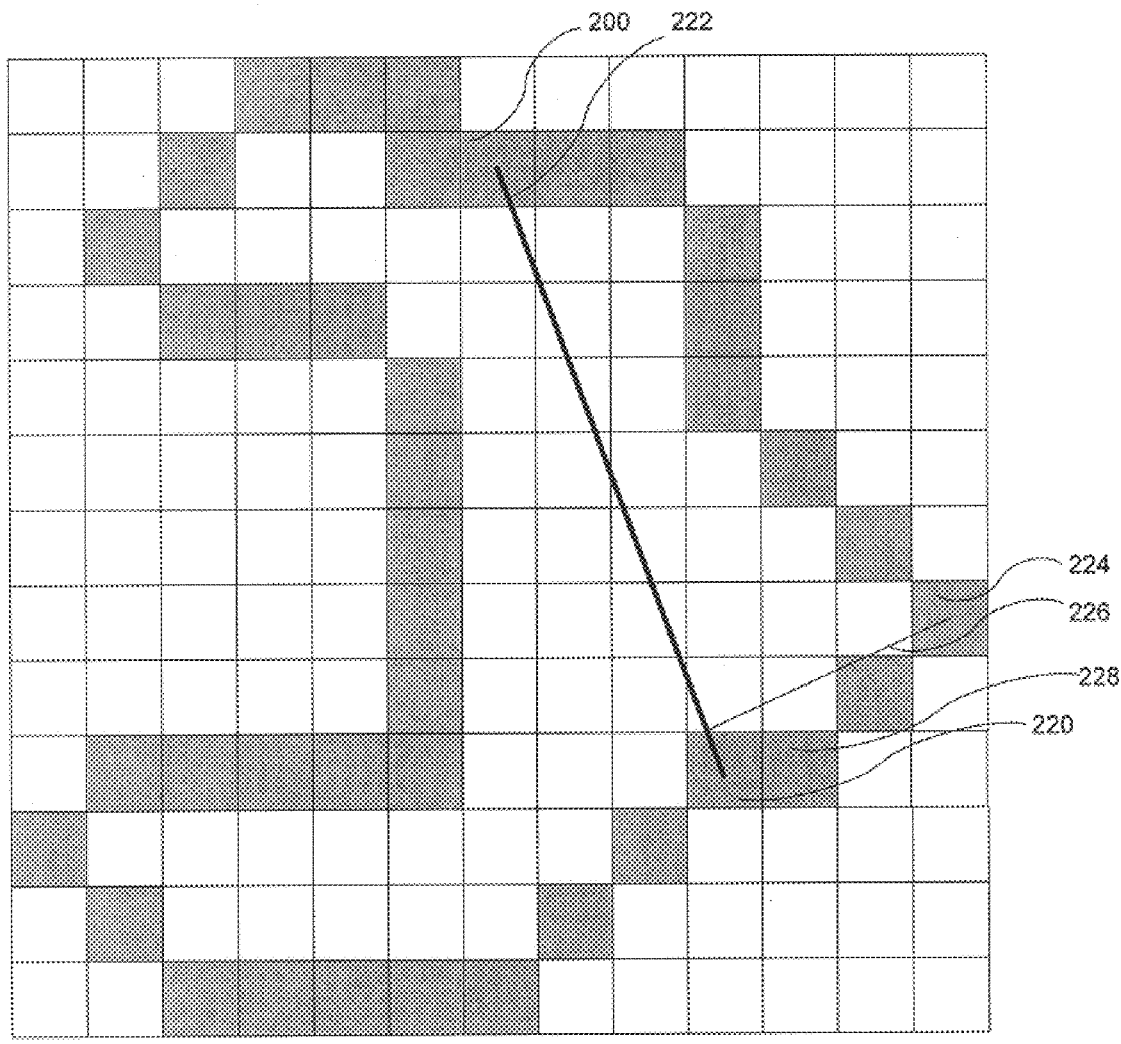
FIG. 12 illustrates the determination of a vertex based on a boundary cell exceeding the prescribed maximum.

If vertex-candidate is not the end of the boundary list, the logic moves to block 148 where a straight line is calculated to join current-vertex and vertex-candidate. For example, FIG. 11 illustrates a side being developed. A straight line 204 is drawn from current-vertex 200 to vertex-candidate 202. Next, the logic of FIG. 6 moves to block 150, where the perpendicular distance to the straight line 204 is determined for all boundary cells between current-vertex and vertex-candidate as shown by lines 206, 208, 210, 212, 214, 216 and 218 in FIG. 11. The logic of FIG. 5 then moves to decision block 152 where a test is made to determine if the perpendicular distance from the straight line to any of the cells between current-vertex and vertex-candidate exceeds the prescribed maximum. If any distance exceeds the prescribed maximum (yes in decision block 152), the current vertex-candidate is rejected and the previous cell is added to the polygon list. See block 154. For example, in FIG. 12, straight line 222 is drawn from current-vertex 200 and vertex-candidate 220. Perpendicular lines are drawn from the straight line 222 to all of the boundary cells in between current-vertex 200 and vertex-candidate 220. For example, perpendicular line 226 is drawn from the straight line 222 to boundary cell 224. If the length of a perpendicular line 226 exceeds the prescribed maximum value, the processing has gone too far and the current vertex-candidate 220 is rejected. The previous boundary cell 228 is added to the polygon list (i.e., list of vertices). The logic then moves to block 156 where current-vertex is set to the previous cell (i.e., the cell just added to the polygon list). The logic then returns to block 142 where vertex-candidate is set to the next cell after the next cell of the current-vertex.

Figure 13:
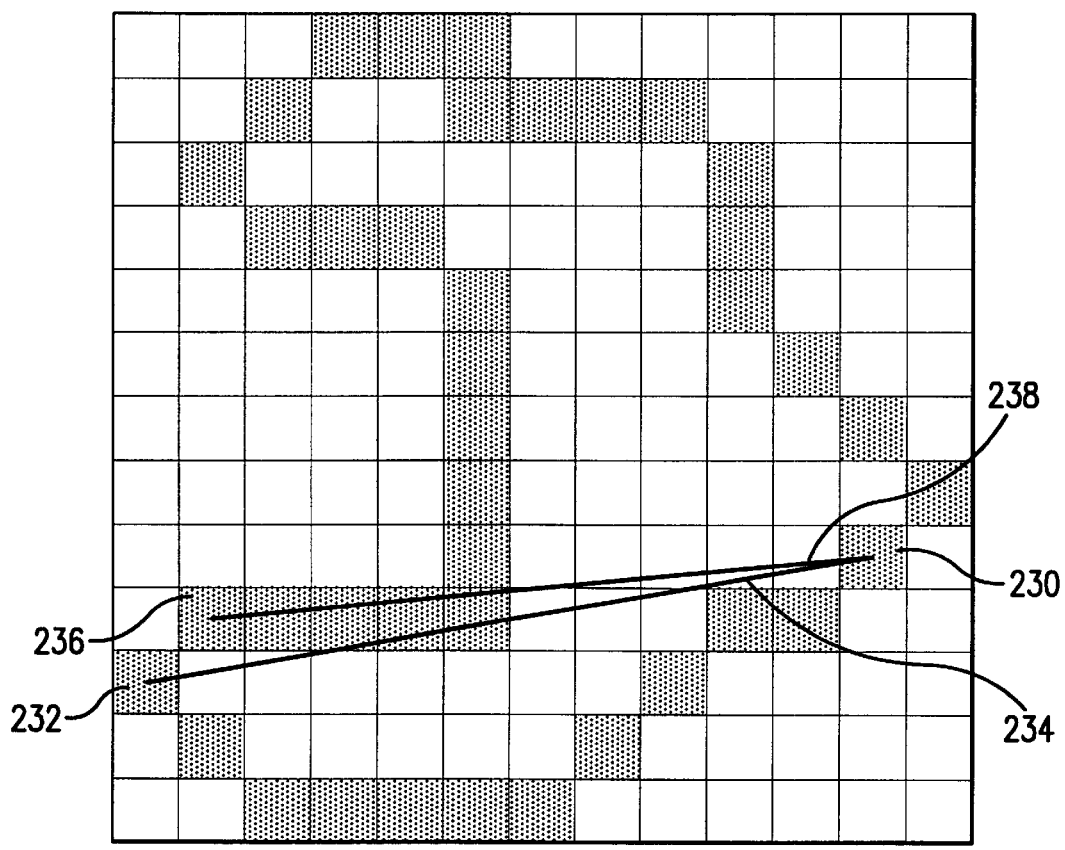
FIG. 13 illustrates the determination of a vertex based on a decrease in the length of a side.

If the distance for all of the boundary cells between the current-vertex and the vertex-candidate is less than the prescribed maximum (no in decision block 152), the logic moves to decision block 158 where a test is made to determine if the length of the side being developed is starting to decrease. FIG. 13 illustrates an example of a decreasing side. Straight line 234 is drawn from the current-vertex 230 to the previous vertex-candidate 232. Straight line 238 is drawn from current-vertex 230 to the current vertex-candidate 236. If the length of the line 238 between current-vertex 230 and the current vertex-candidate 236 is less than the length of the line between current-vertex 230 and the previous vertex-candidate 232, the length of the side is starting to decrease and the logic of FIG. 6 moves to block 160 where the current vertex-candidate is added to the polygon list. Current-vertex is then set to vertex-candidate in block 162. The logic then returns to block 142.

If it is determined in decision block 144 that vertex-candidate is the end of the boundary list, the logic moves to block 146 where a test is made to determine if there are more boundaries to process. If so, the logic returns to block 140 and the process is repeated until there are not any more boundaries to process. When there are not any more boundaries to process, the logic of FIG. 6 ends and processing returns to FIG. 4.

Returning to FIG. 4, after all of the vertices have been determined, the logic of FIG. 4 ends. The result is an ordered list of data points in either x/y or latitude/longitude formats. When the ordered list of data points are displayed and connected, they form one or more closed polygons. The data points can be transmitted for display on one or more remote display devices.

Figure 14:
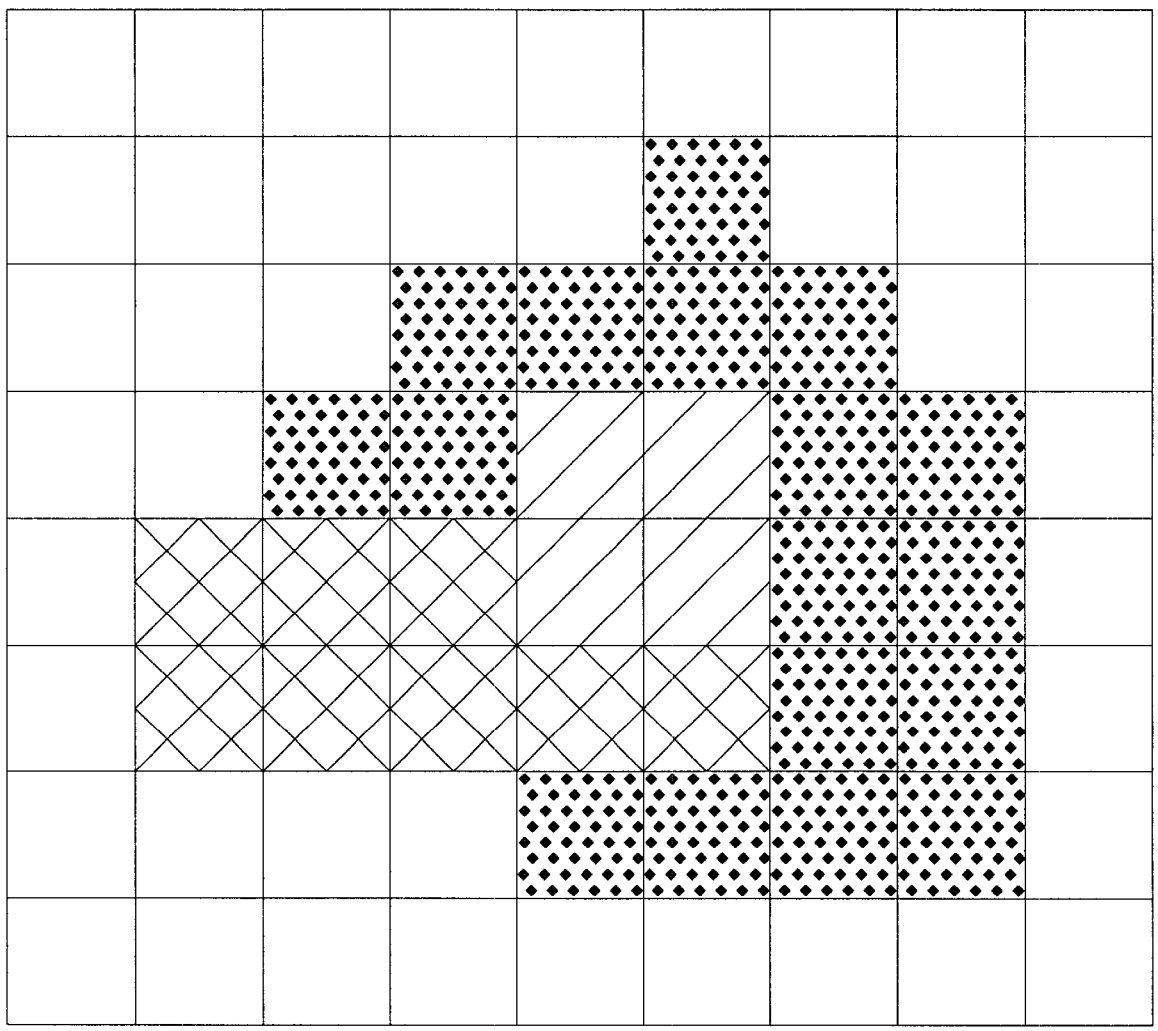
FIGS. 14–17 illustrate an example of processing multiple colors.
Figure 14:
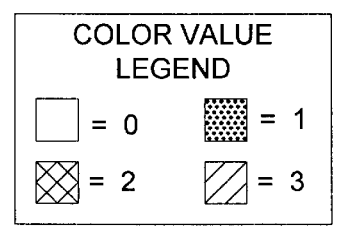
Figure 15:
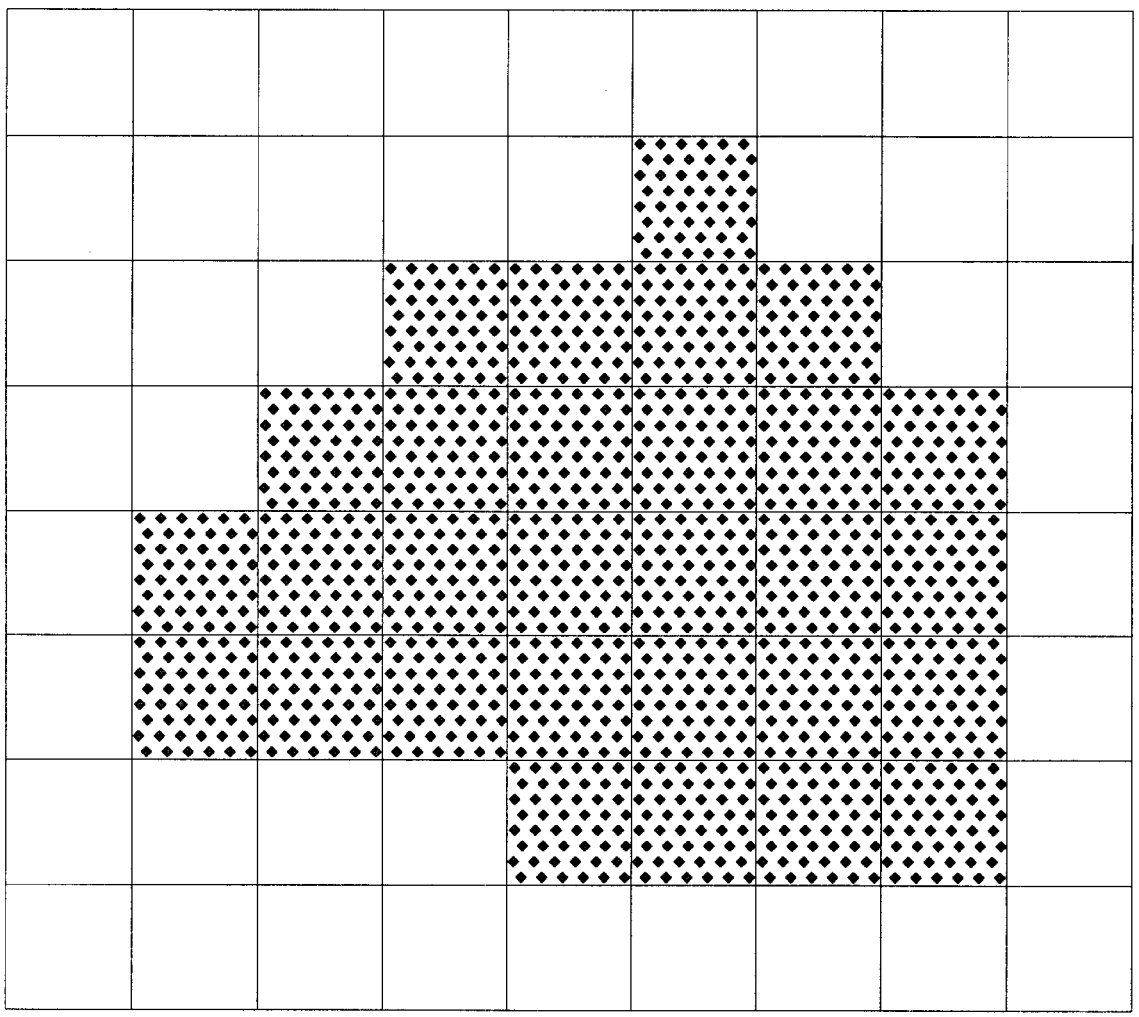
Figure 15:
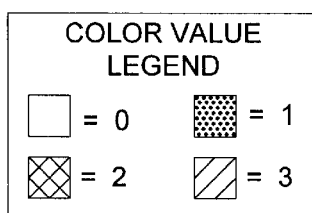
Figure 16:
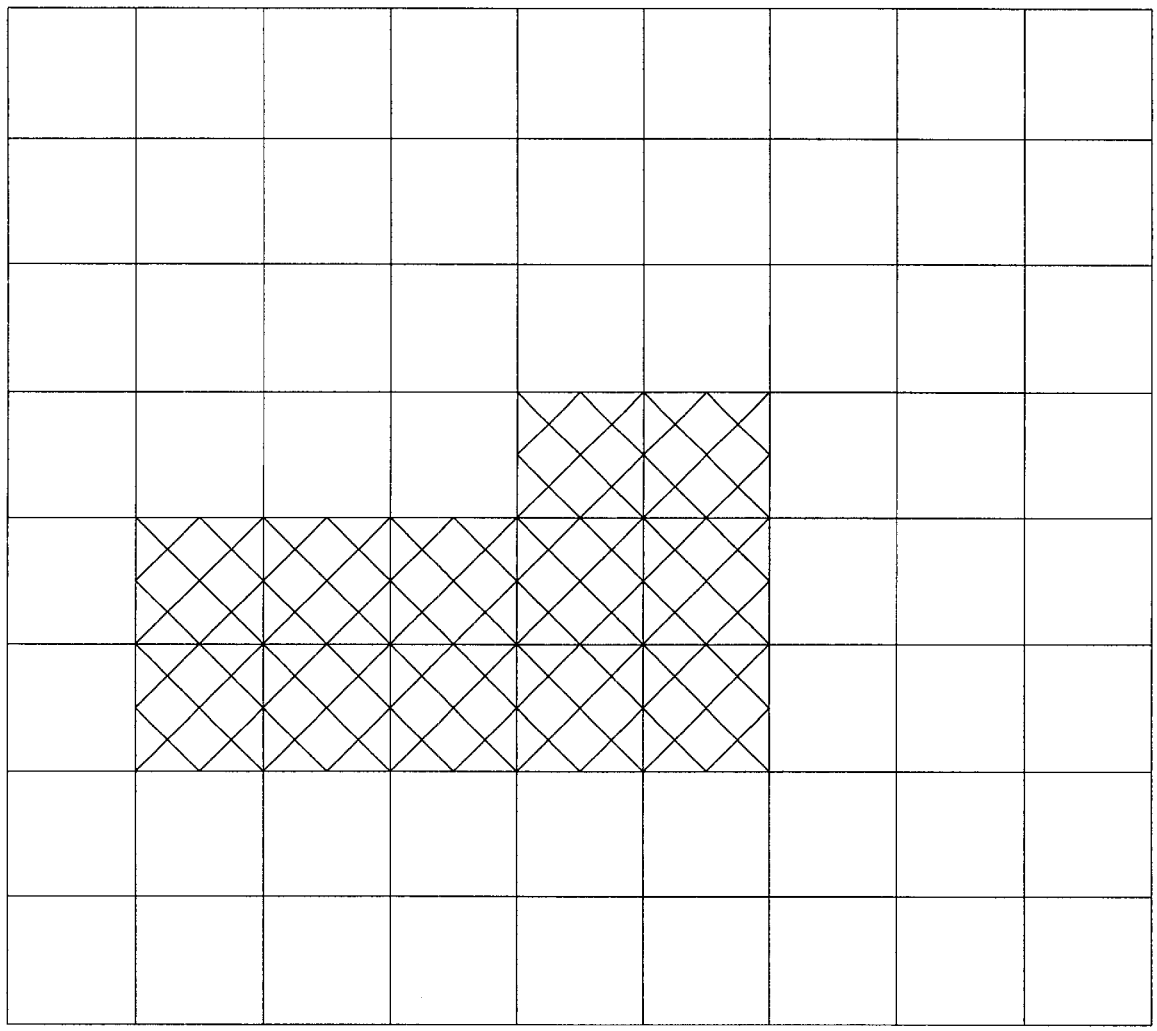
Figure 17:
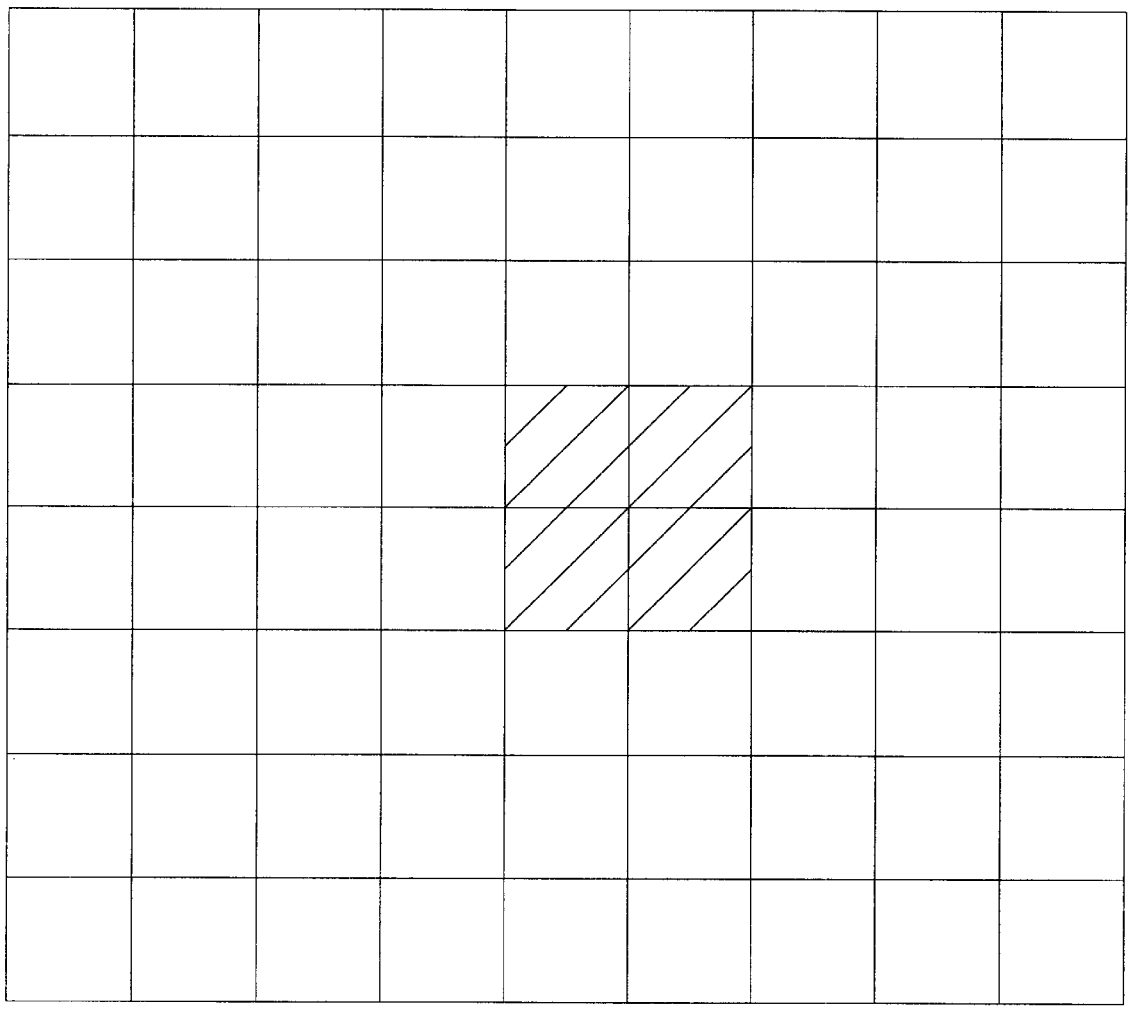
Figure 17:
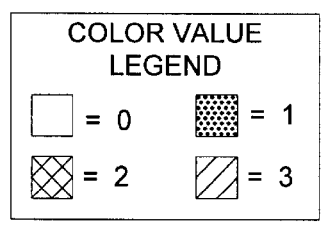

FIGS. 14–17 illustrate processing multiple colors. FIG. 14 is an example showing matrix data containing cells with four different color values. FIG. 15 illustrates developing a polygon for color values equal to or greater than 1. FIG. 16 illustrates developing a polygon for color values equal to or greater than 2. FIG. 17 illustrates developing a polygon for color values equal to or greater than 3. Once the polygons have been formed, visibility can be recorded using various schemes. For example, "Z" order may be used which records a front-to-back position. Alternative schemes may record areas and render polygons in order of descending area.

The present invention is adaptive in that polygons can be created with varying fidelity. This is accomplished using variable criteria. For example, a user may specify a maximum file size. A default prescribed length is determined based on the specified criteria. After processing is complete, a check is made to see if the criteria was met. For example, if a maximum file size of ten kilobytes is specified, after processing, the file size is examined. If the file size exceeds the specified maximum file size(i.e., ten kilobytes), the maximum prescribed distance is increased and the processing is repeated. This process is iterated until the specified criteria is met.

A maximum number of vertices per polygon may also be specified instead of or in addition to a maximum file size. If a maximum number of vertices per polygon is specified, the vertices are counted as each polygon is being created. If the maximum number of vertices is met as a polygon is being created, the prescribed distance is increased and processing for the polygon is restarted.

While a specific embodiment of this invention has been described above, those skilled in the art will readily appreciate that many modifications are possible in the specific embodiment, without materially departing from the novel teachings and advantages of this invention. Accordingly, all such modifications are intended to be included within the scope of this invention, as defined in the following claims.

Having thus described the invention, what is claimed is:

1. A method for generating polygon data from matrix data, said method comprising the steps of:

a. obtaining a matrix of data, wherein said matrix of data comprises a plurality of cells;

b. defining a maximum file size;

c. converting the matrix of data into at least one polygon comprising a series of data points wherein the data points are stored in a storage medium;

d. using a fidelity value to determine the vertices of the at least one polygon;

e. changing the fidelity value to a coarser fidelity value if the storage required for the data points of the at least one polygon exceeds the maximum file size; and f. repeating the step of converting the matrix of data into at least one polygon until the storage required for the data points of the at least one polygon does not exceed the maximum file size.

2. The method of claim 1, wherein the at least one polygon comprises at least one concave polygon.

3. The method of claim 1, wherein the fidelity value is variable.

4. The method of claim 1, wherein the matrix of data is in a bitmap format.

5. The method of claim 1, wherein the matrix of data is in a gridded format.

6. The method of claim 1, wherein the series of data points comprises at least one data point representing a vertex of the at least one polygon.

7. The method of claim 6, further comprising:

a. defining a maximum number of vertices per polygon;

b. if a polygon contains more data points than the maximum number of vertices per polygon, changing the fidelity value to a coarser fidelity value; and c. recomputing the polygon containing more data points than the maximum number of vertices per polygon until the polygon does not contain more vertices than the maximum number of vertices per polygon.

8. The method of claim 7, wherein the maximum number of vertices per polygon is defined by a user.

9. The method of claim 1, wherein the maximum file size is defined by a user.

10. The method of claim 6, wherein the data points are in an x/y format.

11. The method of claim 6, wherein the data points are in a latitude/longitude format.

12. The method of claim 1, wherein the matrix data and the polygon data is weather data.

13. A method for converting a matrix of data cells to at least one polygon, said method comprising:

a. obtaining the matrix of data cells, wherein the data for each data cell includes a color value;

b. determining which cells in the matrix of data cells are boundary cells;

c. adding the cells that have a color value that matches a specified color value to a list of cells to check;

d. adding the boundary cells from the list of cells to check to a boundary list; and e. determining which cells in the boundary list are vertices.

14. The method of claim 9, wherein steps be are repeated for all of the color values in the matrix of data cells.

15. The method of claim 13, wherein said determining which cells in the boundary list are vertices is based on a fidelity value.

16. The method of claim 15, wherein the fidelity value is variable.

17. In a computer system, a computer-readable medium holding computer executable instructions for performing a method comprising:

a. obtaining matrix data, wherein the matrix data comprises a plurality of cells, and wherein the matrix data for each cell includes a color value;

b. determining which cells in the matrix data are boundary cells;

c. adding all cells which have a color value that matches a specified color value to a list of cells to check;

d. adding the boundary cells from the list of cells to check to a boundary list; and e. determining which cells in the boundary cell list are vertices.

* * * * *